(12) United States Patent
Karanasou et al.

(10) Patent No.: US 11,830,476 B1
(45) Date of Patent: Nov. 28, 2023

(54) LEARNED CONDITION TEXT-TO-SPEECH SYNTHESIS

(71) Applicant: Amazon Technologies, Inc., Seattle, WA (US)

(72) Inventors: Panagiota Karanasou, Cambridge (GB); Sri Vishnu Kumar Karlapati, Cambridge (GB); Alexis Pierre Moinet, Cambridge (GB); Arnaud Vincent Pierre Yves Joly, Cambridge (GB); Syed Ammar Abbas, Cambridge (GB); Thomas Renaud Drugman, Carnieres (BE); Jaime Lorenzo Trueba, Cambridge (GB)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 182 days.

(21) Appl. No.: 17/342,206

(22) Filed: Jun. 8, 2021

(51) Int. Cl.
*G10L 13/033* (2013.01)
*G10L 25/51* (2013.01)
*G10L 13/10* (2013.01)
*G10L 13/08* (2013.01)
*G06N 3/08* (2023.01)
*G10L 25/30* (2013.01)
*G10L 13/07* (2013.01)

(52) U.S. Cl.
CPC .......... *G10L 13/10* (2013.01); *G06N 3/08* (2013.01); *G10L 13/07* (2013.01); *G10L 13/086* (2013.01); *G10L 25/30* (2013.01)

(58) Field of Classification Search
CPC ........ G10L 25/51; G10L 15/00; G10L 13/033
See application file for complete search history.

(56) References Cited

U.S. PATENT DOCUMENTS

| | | | | |
|---|---|---|---|---|
| 11,222,627 B1* | 1/2022 | Qian | | G10L 15/1822 |
| 2019/0197121 A1* | 6/2019 | Jeon | | G10L 25/51 |
| 2020/0372897 A1* | 11/2020 | Battenberg | | G10L 13/033 |
| 2022/0051654 A1* | 2/2022 | Finkelstein | | G06N 3/088 |
| 2022/0122582 A1* | 4/2022 | Elias | | G06N 3/045 |
| 2022/0246132 A1* | 8/2022 | Zhang | | G10L 13/047 |
| 2022/0301543 A1* | 9/2022 | Elias | | G06N 3/088 |
| 2022/0415306 A1* | 12/2022 | Clark | | G06N 3/045 |

FOREIGN PATENT DOCUMENTS

| | | | |
|---|---|---|---|
| CN | 111598153 A * | 8/2020 | ........... G06K 9/6215 |
| EP | 3944146 A1 * | 1/2022 | |
| KR | 102277205 B1 * | 3/2020 | |
| WO | WO-2020036178 A1 * | 2/2020 | ........... G10L 15/063 |
| WO | WO-2021183229 A1 * | 9/2021 | |

* cited by examiner

*Primary Examiner* — Shreyans A Patel
(74) *Attorney, Agent, or Firm* — K&L Gates LLP

(57) ABSTRACT

Devices and techniques are generally described for learned condition text-to-speech synthesis. In some examples, first data representing a selection of a type of prosodic expressivity may be received. In some further examples, a selection of content comprising text data may be received. First audio data may be determined that includes an audio representation of the text data. The first audio data may be generated based at least in part on sampling from a first latent distribution generated using a conditional primary variational autoencoder (VAE). The sampling from the first latent distribution may be conditioned on a first learned distribution associated with the type of prosodic expressivity. In various examples, the first audio data may be sent to a first computing device.

20 Claims, 7 Drawing Sheets

LEARNED CONDITION TEXT-TO-SPEECH SYNTHESIS

BACKGROUND

A speech processing system includes a speech synthesis component for processing input data such as text data to determine output data that includes a representation of speech (e.g., audio) corresponding to the text data. The speech includes variations in prosody, such as variations in speech rate, emphasis, timbre, and/or pitch. The prosody of the speech may be learned by processing audio data and then determined by processing the text data.

DETAILED DESCRIPTION

Figure 1:
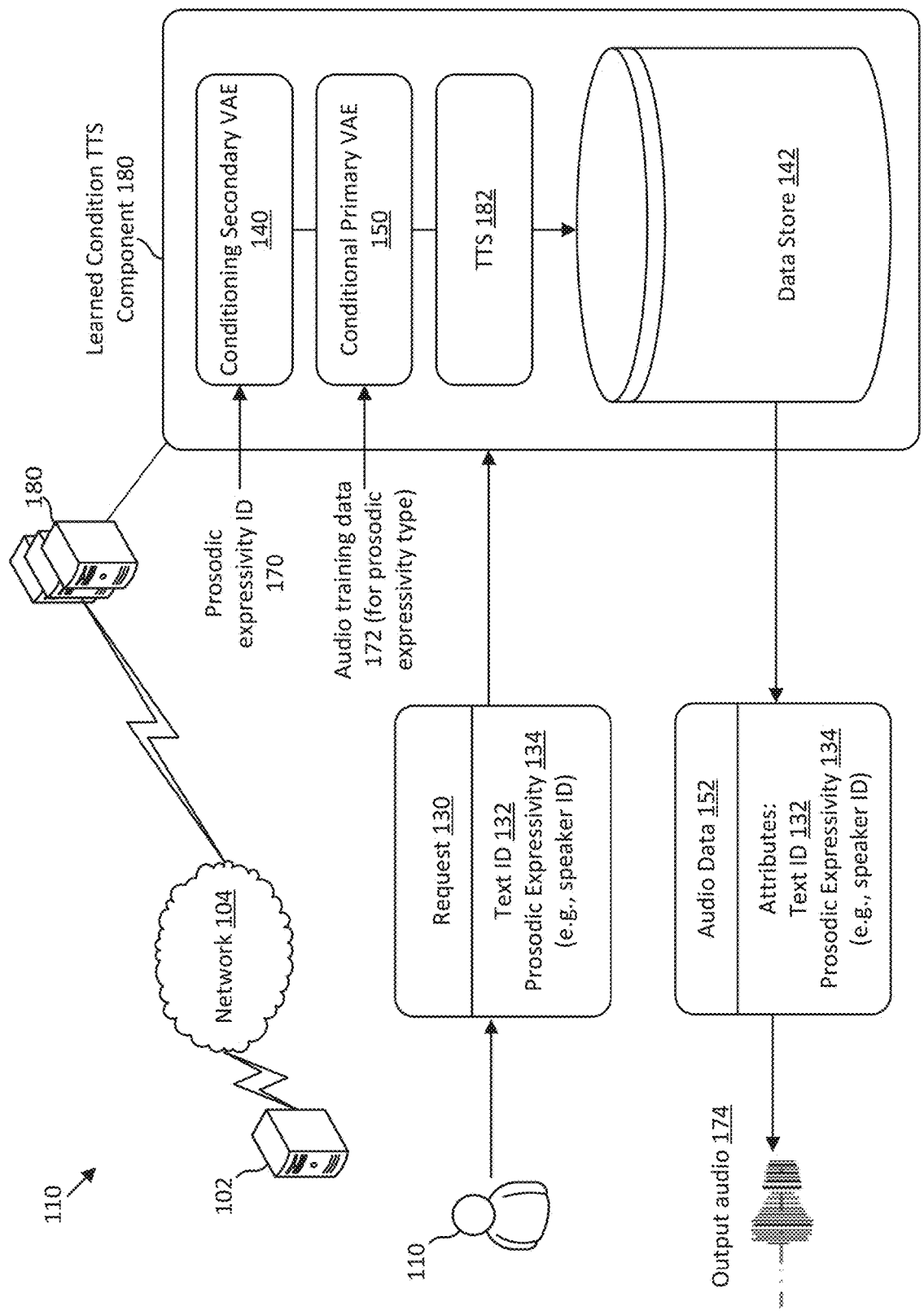
FIG. 1 is a diagram illustrating an example of audio data generation by a multi-condition text-to-speech component, in accordance with various aspects of the present disclosure.

In the following description, reference is made to the accompanying drawings that illustrate several examples of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Speech-processing systems may include one or more speech-synthesis components that employ one or more of various techniques to generate synthesized speech from input data (such as text data or other data representing words such as word identifiers, indices or other indicators of words, word embedding data, etc.). The speech-synthesis component may include a phoneme encoder for processing the text data and determining phoneme embedding data representing a number of phonemes of the text data, a prosody prediction component for processing the text data to determine prosody embedding data corresponding to the predicted prosody of the text data, and a speech decoder for processing the phoneme encoded data and the prosody embedding data to determine output data representing the speech.

As the term is used herein, "prosody" and/or "prosodic expressivity" refers to the manner in which a given word, sentence, paragraph, or other unit of speech is spoken. Aspects of prosody may include the rate of the speech, the loudness of the speech, how syllables, words, or sentences in the speech are emphasized, when and where pauses in the speech may be inserted, or what emotion (e.g., happy, sad, or anxious) is expressed in the speech. Prosody and/or other qualities of human speech may be described herein as "audio conditions" and/or "prosodic expressivity."

Numerous factors, such as linguistic content, speaking style, dialect, speaker identity, emotional state, and environment influence speech and make variability one of the inherent characteristics of natural human speech. The presence of one or many of these factors results in different renditions of a given sentence when transformed from text into speech. However, typical TTS systems are unable to produce multiple renditions of the same sentence in a natural sounding manner. That is why recent probabilistic generative models, such as variational autoencoders (VAEs), have been used to learn a latent representation that captures the variability of speech. This latent space captures a distribution over multiple renditions and, thus, sampling from it can produce varied speech.

In the previous probabilistic generative approaches, sampling is done from the VAE latent space using a standard Gaussian prior. Such a prior, even if it still represents natural prosody, loses some of the variability of real speech, and has been shown to lead to over-regularization and poor latent representations of input. In addition, there is no controllability on the part of the latent space from which a sample is taken.

In various embodiments described herein, systems and techniques are described that use a more informative prior that handles the aforementioned caveats. This prior is conditioned on a specific factor that influences speech and introduces condition-specific clusters to the VAE latent space. In that way, the variability induced by a given audio condition and/or type of prosodic expressivity (e.g., speaker identity, a language associated with the speaker, emotion associated with the synthesized speech, etc.) is maintained in the latent space. Then, by providing the desired audio conditioning during inference, a specific part of the latent space that captures the characteristics associated with the type of prosodic expressivity is sampled from (e.g., speaker identity and prosodic variability). In other words, controllability of the generated speech is achieved using disentanglement that results from using a conditional prior rather than a Gaussian prior.

In various embodiments described herein, a learned conditional posterior is used as a prior in a hierarchical VAE structure. A conditioning secondary VAE (CSVAE) takes as input identifier data identifying a type of prosodic expressivity influencing speech (e.g., a speaker vector identifying a particular speaker from among other speakers), the CSVAE learns a latent distribution of this conditioning signal. This can also be seen as generating TTS-specific speaker embeddings that are trained jointly with the rest of the system. The learned posterior distribution then acts as the prior of the primary encoder (e.g., a conditional primary VAE (CPVAE)). Accordingly, described herein are systems and techniques that use a learned conditional prior in TTS.

The typical approach to add a condition to a VAE is the Conditional VAE (CVAE). In CVAE, the condition is concatenated to the VAE encoder and decoder inputs. This maintains the identity of the condition, while sampling is done in practice from a standard Gaussian prior distribution. In other words, although the encoder and decoder are conditional, the latent space itself, as expressed by the prior, follows a Normal distribution. In the systems and techniques described herein, by contrast, sampling is done from a learned conditional prior. This provides added controllability over the sampling from a structured latent space. In addition, using a more informative prior generates samples with more prosodic variability.

Figure 2:
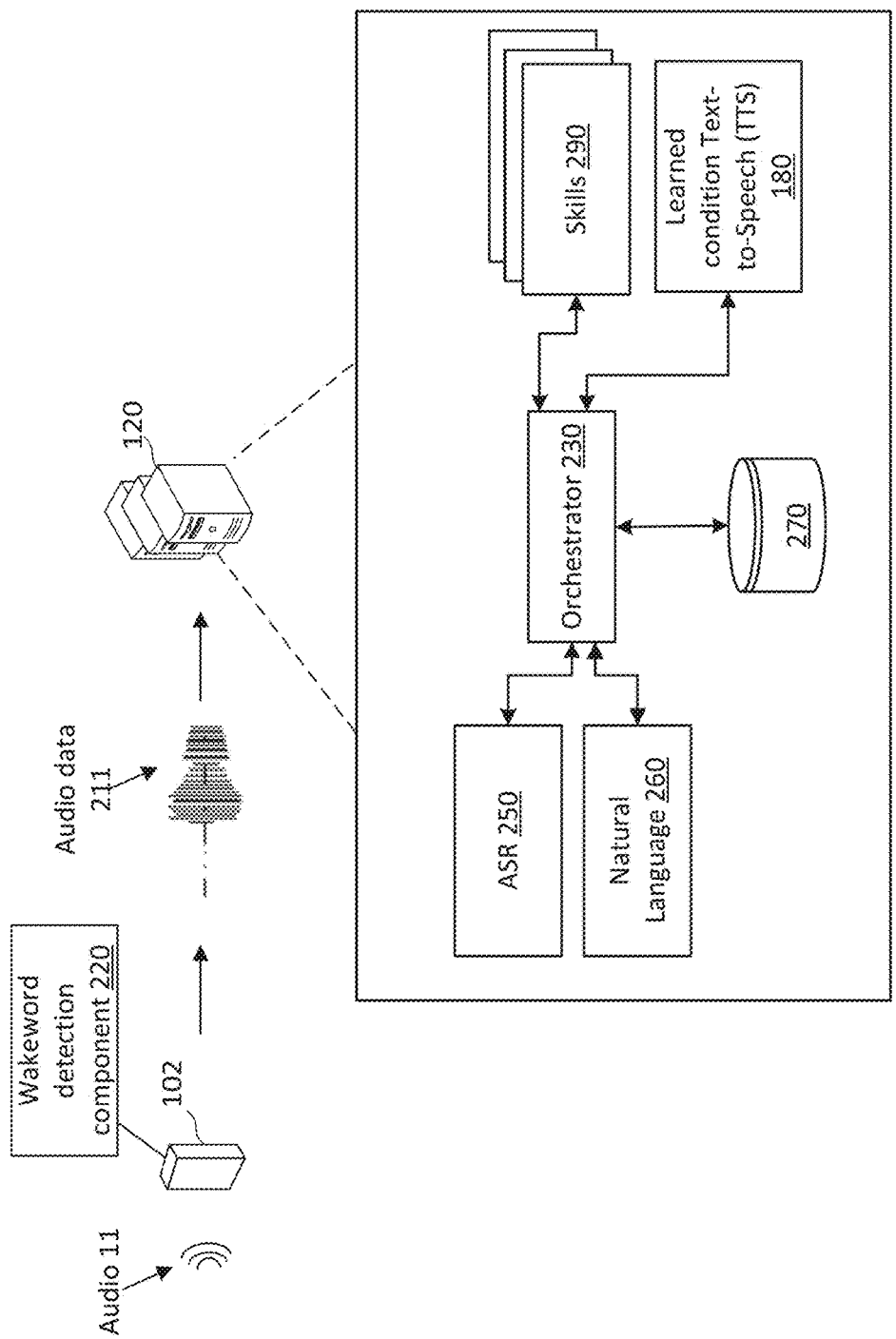
FIG. 2 is a block diagram of a natural language processing system that may include or be used with a multi-condition text-to-speech component, in accordance with various aspects of the present disclosure.

FIG. 1 is a diagram illustrating an example of audio data generation by a learned condition text-to-speech component, in accordance with various aspects of the present disclosure. In various examples, a user 110 may interact with a computing device 102 via an interface. Computing device 102 may be, for example, a speech processing enabled device such as a virtual assistant device, a mobile device (e.g., a smart phone, a laptop, etc.), a wearable device, a desktop computing device, an embedded system, etc. In various examples, computing device 102 may be effective to communicate with one or more remote devices via a network 104 (e.g., a wide area network (WAN) such as the Internet). In the example depicted in FIG. 1, computing device 102 may communicate with a learned condition TTS component 180. In some examples, the learned condition TTS component 180 may be part of and/or may communicate with a natural language processing system, such as natural language processing system 120 (FIG. 2).

An illustrative example is shown and described in reference to FIG. 1. However, additional information describing the learned condition TTS component 180 is described in further detail below in reference to other figures. In the example of FIG. 1, user 110 may send a request 130 to the learned condition TTS component 180. The request 130 may be generated via computing device 102 and may be sent over network 104 to the learned condition TTS component 180. However, in some other examples, the learned condition TTS component 180 may be executed locally on computing device 102.

The request 130 may be, for example, a request to output text as audio via a TTS system. The request 130 may comprise text ID 132. Text ID 132 may be identifier data identifying the text which is to be transformed into speech that represents the text in audio form (e.g., that represents the text as speech). Additionally, the request 130 may comprise one or more types of prosodic expressivity 134. The prosodic expressivity 134 may be, for example, data identifying a particular speaker to use to output the speech from the TTS system. For example, the text ID 132 may identify a novel and the prosodic expressivity 134 may identify a voice actor, author, or celebrity in whose voice to read the novel. However, in some other examples, the prosodic expressivity 134 may represent a different characteristic such as an emotion (e.g., happy, enthusiastic, angry, excited, etc.), a dialect, an accent, a style associated with a native speaker of a particular language, a speaking style, etc., with which to read the text. In some examples, the type of prosodic expressivity may represent a native language spoken by the speaker. In such cases the type of prosodic expressivity may be identified by language identifier data. The request 130 may be sent to the learned condition TTS component 180.

Prior to receipt of the request 130, the conditioning secondary VAE 140 and the conditional primary VAE 150 of the learned condition TTS component 180 may be trained. Training of such components of the learned condition TTS component 180 is described in further detail below with respect to FIGS. 3A and 3B. In general, the conditioning secondary VAE 140 (CSVAE 140) may learn a latent distribution that is associated with the prosodic expressivity identified by the prosodic expressivity ID 170. For example, the prosodic expressivity ID may be an one hot embedding of a speaker vector that identifies various different speakers. Similarly, the conditional primary VAE 150 (CPVAE 150) may receive audio training data 172 that includes audio corresponding to the different prosodic expressivity ID 170.

For example, a first speaker may be associated with a first speaker vector. Accordingly, the first speaker vector may be sent to conditioning secondary VAE 140 as the prosodic expressivity ID 170 during training, while the corresponding audio of the first speaker may be sent to conditional primary VAE 150 as audio training data 172. The conditioning secondary VAE 140 learns a latent distribution of this conditioning signal. The conditional primary VAE 150 generates an encoding that is conditioned on the learned posterior distribution of the conditioning secondary VAE 140.

Accordingly, during inference (e.g., upon receipt of request 130), the prosodic expressivity 134 may be an input to the learned condition TTS component 180 along with the text ID of the text that is to be converted to speech. The encoding of the input text generated by an encoder of TTS 182 (and described in further detail below) may be concatenated with the conditioning signal representing the type of prosodic expressivity (e.g., speaker identity) prior to decoding by a decoder of the TTS 182. Accordingly, the output of the learned condition TTS component 180 is audio data 152. For example, the audio data 152 may be audio data representing the text associated with text ID 132 of the request 130 and the prosodic expressivity 134 (e.g., the requested speaker). The audio data 152 may be transformed into output audio 174 by the computing device 102 and/or some other device effective to output audio.

In the example depicted in FIG. 1, the audio data 152 is output from data store 142. In some examples, the audio data representing text may be generated offline (e.g., prior to receipt of a request for the audio) and may be stored in memory (e.g., data store 142) in association with the text ID and/or with the prosodic expressivity ID. Accordingly, upon receipt of a user request, a lookup may be performed to retrieve the appropriate audio data that has been conditioned on the requested type of prosodic expressivity. However, in some other examples, the audio data 152 may be generated in response to a received request.

In various examples, the computing device 102 may be controllable using a voice interface (e.g., a natural language processing system 120 of FIG. 2). In some examples, natural language processing (e.g., speech processing and/or text processing) may occur wholly or partially on computing device 102. In some other examples, natural language processing may be performed by a natural language processing system 120 that may be configured in communication with computing device 102 over network 104.

FIG. 2 is a block diagram of a natural language processing system that may include or be used with a learned condition text-to-speech component, in accordance with various aspects of the present disclosure. Automatic speech recognition (ASR), as described herein, is a field of computer science, artificial intelligence, and linguistics concerned with transforming audio data associated with speech into text data and/or other ASR output data representative of that speech. Natural language understanding (NLU) is a field of computer science, artificial intelligence, and linguistics concerned with enabling computers to derive meaning from text input containing natural language. In many examples, the natural language input data (e.g., a user utterance and/or input text) may result in specific semantic intent data representing a semantic interpretation of the text. In some examples, the semantic intent data is actionable to cause the natural language processing system and/or a natural language processing application (referred to herein as a "skill") to perform an action. Generally, semantic intent data may represent a goal of a user in making the particular utterance. In some examples, the semantic intent data may include executable commands or other type of instructions that may be used to take some action related to the speech processing system's understanding of the user's request. Thereafter one or more of the semantic intents may be selected for further processing and/or output by the NLU system. For example, the semantic intent associated with the highest confidence score among the different semantic intents generated may be selected for further processing and/or output.

Text-to-speech (TTS) is a field of computer science, artificial intelligence, and linguistics concerned with enabling computers to output synthesized speech. ASR, NLU, and TTS may be used together as part of a natural language processing system. In some examples, other types of input apart from spoken utterances may be received by a natural language processing system. For example, text, visual input (e.g., facial recognition and/or hand recognition), haptic input, and/or other types of input may be received and/or processed by a natural language processing system.

Spoken language understanding (SLU) is a field of computer science, artificial intelligence, and/or linguistics that receives spoken language as an input, interprets the input, and generates executable commands that may be executed by one or more other computing devices and/or speech processing components. In various examples, spoken language understanding may be a combination of ASR systems and NLU systems, while in other examples, spoken language understanding may be a single model or other type of component effective to perform the functions of both ASR and NLU or otherwise take audio data as an input and output executable commands or other types of instructions representing the meaning of the audio data. In various further examples, SLU may include TTS where a machine learning model may receive input audio data (e.g., request data representing user request data and/or user text input data) and may generate output audio data in response to the utterance.

As used herein, user utterances, input text data, and/or any form of data input to a natural language processing system ("input data") may be described by "natural language inputs" and/or simply "inputs." Such request data may change forms many times during processing of the request data by various components of the speech processing system. For example, initially the input data may be audio data and/or input text data representing a user question. The audio data may be transformed into text data and/or other ASR output data by an ASR component of the speech processing system. The text data and/or other ASR output data may be transformed into intent data by an NLU component of the speech processing system.

Intent data may be used by a skill to perform an action (e.g., to generate action data and/or other skill output that may be processed in order to take some corresponding action such as answering a user's question, playing video, playing audio, etc.). NLU processing may be used to determine that the user wants a particular song to be played, book to be read, action to be performed, etc. Accordingly, as described in further detail below, a user may use a particular intent and/or skill to cause user-identified text (e.g., a book) to be read using a particular type of prosodic expressivity (using learned condition TTS component 180).

Natural language inputs may refer to any data related to an input request to a speech processing system (e.g., including the various data forms described above, as each of the aforementioned data types relate to an input request to the speech processing system). In general, as used herein, skills may be any software (and/or combination of software and hardware) used during speech processing to take an action in response to input request data (e.g., natural language inputs such as user utterances and/or text).

In various examples, speech processing systems may determine an intent for particular natural language input according to an interpretation of the natural language input determined by NLU. In various examples, multiple NLU process flows may be executed for a given natural language input, as some process flows may be more effective in deriving semantic meaning from particular types of utterances and/or other natural language inputs. For example, a primary NLU process flow may comprise a rule-based heuristic system utilizing knowledge graphs and/or ontological configurations that have been coded in advance. The primary NLU process flow may use a process known as named entity recognition (NER) to identify entities (e.g., nouns and/or pronouns) in a given natural language input. The entities and/or other semantic language data of a natural language input may be parsed and sent to the knowledge graph, which, in turn, may be used to relate different objects and/or attributes of those entities (data describing characteristics of the entities) to one another.

In various examples, NLU systems and/or components described herein may be multi-modal as the NLU systems may be effective to process other types of inputs besides input natural language data (e.g., text and/or speech). For example, multi-modal NLU systems may be effective to process image data and/or video data to determine visual feature data that semantically represents objects included in the image data. As described in further detail below, multi-modal transformer models may be machine learned models that are effective to take both natural language data and image data as inputs in order to perform some task.

Introduced above, the computing device 102 may be configured to support speech interactions with one or more users and respond to user requests. For instance, a user may verbally request the computing device 102 to perform a particular task, such as to play an audio file of text for the user. One or more microphones of computing device 102 may capture sound associated with the user speech. In some examples, the user may indicate a request by prefacing the request with a predefined keyword, such as a wake word or trigger expression. The computing device 102 may capture user speech and may process the user speech to identify a command. Speech processing, such as automatic speech recognition (ASR), natural language understanding (NLU), and speech synthesis may also be performed. However, in some instances, one or more remotely coupled computing device may perform the speech processing and transmit a response (or data) back to the computing device 102. Upon identifying the command, the computing device 102 may output a response, cause actions to be performed (e.g., playing music or ordering movie tickets), or elicit feedback from the user. In some instances, content identified in this manner may be played through the display and/or the loudspeakers of the computing device 102. However, the computing device 102 may also be configured to provide the content to peripheral devices such as Bluetooth loudspeakers or other peripherals that are nearby or in wired or wireless communication with the computing device 102. For example, in some instances, the computing device 102 may be configured to play music and/or output synthesized speech using a home audio system.

An audio capture component(s), such as a microphone or array of microphones of the computing device 102, captures audio 11. The computing device 102 processes audio data, representing the audio 11, to determine whether speech is detected. The computing device 102 may use various techniques to determine whether audio data includes speech. Some embodiments may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the computing device 102 may implement a limited classifier configured to distinguish speech from background noise. The classifier may be implemented by techniques such as linear classifiers, support vector machines, and decision trees. In still other examples, Hidden Markov Model (HMM) or Gaussian Mixture Model (GMM) techniques may be applied to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the computing device 102 may use a wakeword detection component 220 to perform wakeword detection to determine when a user intends to speak an input to the computing device 102. This process may also be referred to as keyword detection, with a wakeword being a specific example of a keyword. An example wakeword is "Alexa," "Computer," etc.

Wakeword detection is typically performed without performing linguistic analysis, textual analysis, or semantic analysis. Instead, the audio data representing the audio 11 may be analyzed to determine if specific characteristics of the audio data match preconfigured acoustic waveforms, audio signatures, or other data to determine if the audio data "matches" stored audio data corresponding to a wakeword. The stored audio data may be provided by the natural language processing system 120 and/or may be provided by the user.

The wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword spotting builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMI being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the computing device 102 may wake and begin transmitting audio data 211, representing the audio 11, to the natural language processing system 120. The audio data 211 may include data corresponding to the wakeword, or the portion of the audio data 211 corresponding to the wakeword may be removed by the computing device 102 prior to sending the audio data 211 to the natural language processing system 120.

Upon receipt by the natural language processing system 120, the audio data 211 may be sent to an orchestrator component 230. The orchestrator component 230 may include memory and logic that enable the orchestrator component 230 to transmit various pieces and forms of data to various components of the system, as well as perform other operations. The orchestrator component 230 sends the audio data 211 to an ASR component 250. The ASR component 250 transcribes the audio data 211 into text data. The text data output by the ASR component 250 represents one or more than one (e.g., in the form of an N-best list) hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 sends the text data generated thereby to an NLU component 260, for example via the orchestrator component 230. The text data sent from the ASR component 250 to the NLU component 260 may include a top scoring ASR hypothesis or may include an N-best list including multiple ASR hypotheses. An N-best list may additionally include a respective score associated with each ASR hypothesis represented therein. Each score may indicate a confidence of ASR processing performed to generate the ASR hypothesis with which the score is associated.

The NLU component 260 attempts to make a semantic interpretation of the phrases or statements represented in the text data input therein. That is, the NLU component 260 determines one or more meanings associated with the phrases or statements represented in the text data based on words represented in the text data. The NLU component 260 determines an intent (e.g., intent data) representing an action that a user desires be performed as well as pieces of the input text data that allow a device (e.g., the computing device 102, the natural language processing system 120, the gateway system, etc.) to execute the intent. For example, if the text data corresponds to "call John," the NLU component 260 may determine an intent that the system establish a two-way communication channel between the computing device 102 originating the call and a device of the recipient "John." For further example, if the text data corresponds to "tell John I am on my way," the NLU component 260 may determine an intent that the system send a message to a device of the recipient "John," with the message corresponding to "I am on my way."

The NLU component 260 outputs NLU results to the orchestrator component 230. The NLU results may include an NLU hypothesis, including a representation of an intent and corresponding slotted data that may be used by a downstream component to perform the intent. Alternatively, the NLU results data may include multiple NLU hypotheses, with each NLU hypothesis representing an intent and corresponding slotted data. Each NLU hypothesis may be associated with a confidence value representing a confidence of the NLU component 260 in the processing performed to generate the NLU hypothesis associated with the confidence value.

The orchestrator component 230 may send the NLU results to an associated skill component 290. If the NLU results include multiple NLU hypotheses, the orchestrator component 230 may send a portion of the NLU results corresponding to the top scoring NLU hypothesis to a skill component 290 associated with the top scoring NLU hypothesis.

A "skill" or "skill component" may be software running on the natural language processing system 120 that is akin to a software application running on a traditional computing device. That is, a skill component 290 may enable the natural language processing system 120 to execute specific functionality in order to perform one or more actions (e.g., provide information to a user, display content to a user, output music, or perform some other requested action). The natural language processing system 120 may be configured with more than one skill component 290. For example, a weather skill component may enable the natural language processing system 120 to provide weather information, a ride sharing skill component may enable the natural language processing system 120 to schedule a trip with respect to a ride sharing service, a restaurant skill component may enable the natural language processing system 120 to order food with respect to a restaurant's online ordering system, a communications skill component may enable the system to perform messaging or multi-endpoint communications, etc. A skill component 290 may operate in conjunction between the natural language processing system 120 and other devices such as the computing device 102 in order to complete certain functions. Inputs to a skill component 290 may come from various interactions and input sources.

The functionality described herein as a skill or skill component may be referred to using many different terms, such as an action, bot, app, application, speechlet or the like. A skill component 290 may include hardware, software, firmware, or the like that may be dedicated to the particular skill component 290 or shared among different skill components 290. A skill component 290 may be part of the natural language processing system 120 (as illustrated in FIG. 2) or may be located at whole (or in part) with one or more separate systems. Unless expressly stated otherwise, reference to a skill, skill device, or skill component may include a skill component operating within the natural language processing system 120 (for example as skill component 290) and/or skill component operating within a system separate from the natural language processing system 120.

A skill component 290 may be configured to perform one or more actions. A skill may enable a skill component 290 to execute specific functionality in order to provide data or produce some other output requested by a user. A particular skill component 290 may be configured to execute more than one skill. For example, a weather skill may involve a weather skill component providing weather information to the natural language processing system 120, a ride sharing skill may involve a ride sharing skill component scheduling a trip with respect to a ride sharing service, an order pizza skill may involve a restaurant skill component ordering pizza with respect to a restaurant's online ordering system, etc.

The natural language processing system 120 may include a learned condition TTS component 180 that generates audio data (e.g., synthesized speech conditioned on an input type of prosodic expressivity) from text data using one or more different methods. In one method of synthesis called unit selection, the learned condition TTS component 180 matches text data against a database of recorded speech. The learned condition TTS component 180 selects matching units of recorded speech and concatenates the units together to form audio data. In another method of synthesis called parametric synthesis, the learned condition TTS component 180 varies parameters such as frequency, volume, and noise to create audio data including an artificial speech waveform. Parametric synthesis uses a computerized voice generator, sometimes called a vocoder. In various examples described herein (e.g., in reference to FIGS. 1, 3A, and 3B), the learned condition TTS component 180 may use a hierarchical VAE system to generate prosody-rich synthesized speech for various applications.

The natural language processing system 120 may include storage 270. In various examples, storage 270 may include profile data, data store 142, various machine learning models and/or parameters of such models, contextual data, etc. Various components of the natural language processing system 120 may access data stored in storage 270 in order to perform the various, respective functions of the components.

Figure 3A:
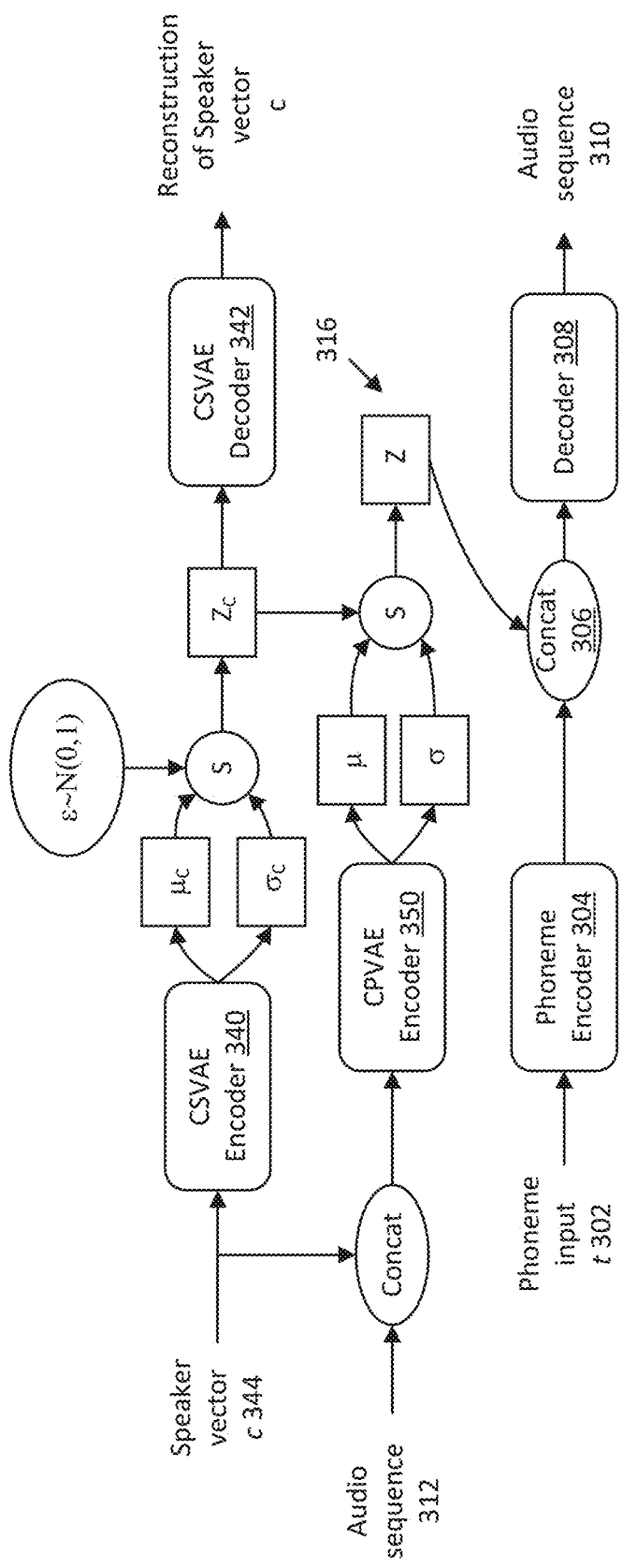
FIG. 3A is a diagram illustrating an example architecture for a learned condition text-to-speech component, according to various embodiments of the present disclosure.
Figure 3B:
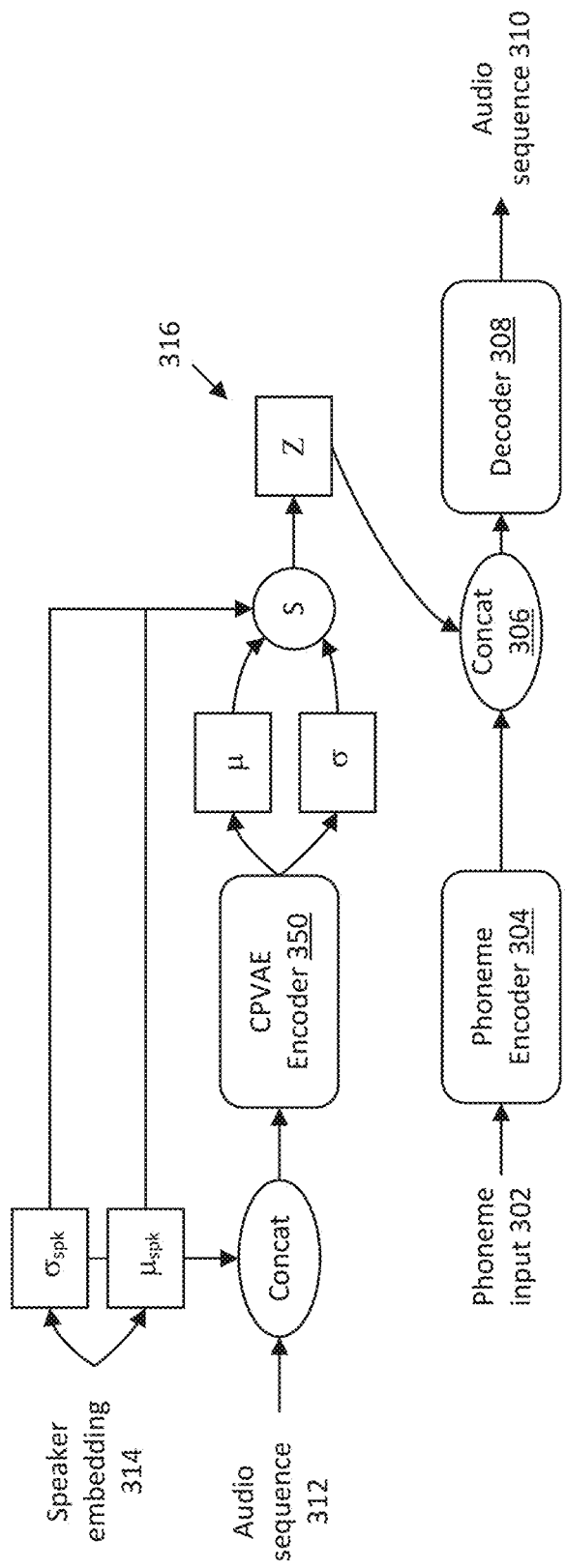
FIG. 3B is a diagram illustrating another example architecture of a learned condition text-to-speech component, according to various embodiments of the present disclosure.

FIG. 3B is a diagram illustrating an example architecture for a learned condition text-to-speech component, according to various embodiments of the present disclosure. A brief introduction to some of the machine learning models depicted in FIGS. 3A, 3B is provided below.

Variational Autoencoder (VAE) and Conditional VAE (CVAE)

A VAE is a generative model where a set of latent variables z is sampled from the prior distribution $p_\theta(z)$ and the data x is generated by the generative distribution $p_\theta(x|z)$ conditioned on z, where θ is the set of parameters of the model. It is trained to maximize the log-likelihood $p_\theta(x)$ by using the evidence lower bound (ELBO) of the log-likelihood as the objective function:

$$\text{ELBO}(\theta,\phi) = -\text{KL}(q_\phi(z|x) \| p_\theta(z)) + \mathbb{E}_{q_\phi(z|x)}[\log p_\theta(x|z)], \quad (1)$$

where $q_\phi(z|x)$ is an introduced approximate posterior to address the intractability of the true posterior $p_{74}(z|x)$ in maximum likelihood inference. It can be seen as a regularized version of an autoencoder, where $q_\phi(z|x)$ can be considered as the encoder and $p_\theta(x|z)$ as the decoder. The objective function comprises two terms. The first term is the Kullback-Leibler (KL) divergence that attempts to make the approximate posterior $q_\phi(z|x)$ close to the prior $p_\theta(z)$. The second term is the reconstruction loss that attempts to make the reconstructed data close to the original ones.

The prior over latent variables $p_\theta(z)$ is assumed to follow a standard Gaussian distribution $\mathcal{N}(z; 0, \mathbb{I})$, where $\mathbb{I}$ is the identity matrix. The approximate posterior $q_\phi(z|x)$ is also modelled by a Gaussian distribution $\mathcal{N}(z; \mu, \sigma^2)$. Following the "reparametrization trick", sampling z from distribution $\mathcal{N}(z; \mu, \sigma^2)$ is decomposed to first sampling from $\in \sim \mathcal{N}(z, 0, \mathbb{I})$ and then computing $$z = \mu + \sigma \odot \in. \quad (2)$$

CVAE is a known approach representing an extension of VAE, where the distribution of the output space x is modelled by a generative model conditioned on the conditioning variable or observation c. The model is trained to maximize the conditional log-likelihood, log $p_\theta(x|c)$, thus the variational training objective becomes $$\text{ELBO}(\theta,\phi) = -\text{KL}(q_\phi(z|x,c) \| p_\theta(z|c)) + \mathbb{E}_{q_\phi(z|x,c)}[\log p_\theta(x|z,C)], \quad (3)$$

where both the encoder $q_\phi(z|x, c)$ and the decoder $p_\theta(x|z, c)$ are conditioned on the conditioning variable c. Also, the prior distribution $p_\theta(z|c)$ is conditioned on c. In practice, however, the prior distribution of the latent variable is assumed to be independent of c, i.e. $p_\theta(z|c) = p_\theta(z)$. This ignores the conditioning in the sampling process. On the other hand, the various systems and techniques described herein take this conditioning into account explicitly while sampling as is explained in the descriptions of FIGS. 3A and 3B below.

Learned Condition TTS Component Example Architectures

FIG. 3A is a diagram illustrating another example architecture of a learned condition text-to-speech component, according to various embodiments of the present disclosure. The architecture illustrated in FIG. 3A is a seq2seq model comprising two VAE encoders, the Conditional Primary and Secondary VAE encoders (CPVAE encoder 350 and CSVAE encoder 340, respectively). In some examples, the CPVAE encoder 350 may be the encoder of conditional primary VAE 150 of FIG. 1. In some further examples, the CSVAE encoder 340 may be the encoder of conditioning secondary VAE 140 of FIG. 1. In various examples, the CSVAE encoder 340 and CSVAE decoder 342 may comprise simple feedforward layers.

The primary VAE encoder is the "Conditional Primary VAE" (CPVAE) encoder 350 with audio sequence 312 (e.g., a mel-spectrogram) as input. The secondary VAE encoder is the "Conditioning Signal VAE" (CSVAE) encoder 340 that takes as input the type of prosodic expressivity, in the example of FIG. 3A, speaker vector 344 (although any desired type of prosodic expressivity may be used), and learns the distribution of this prosodic expressivity. The posterior distribution from CSVAE then acts as the prior to the sampler of the CPVAE encoder 350. Thus, the sampling of the latent variable explicitly depends on the selected type of prosodic expressivity. In other words, instead of using $p_{74}(z)$ as the prior distribution, a learned posterior $p_\theta(z|c)$ is used.

As depicted in FIG. 3A, the output of the CPVAE encoder 350 is conditioned via concatenation (e.g., concatenation 306), since the two inputs to the encoder, (e.g., the input data (e.g., audio sequence 312 (e.g., a mel-spectrogram)) and the type of prosodic expressivity c (e.g., a speaker vector 344) are deterministic and useful to compress the sample into the latent space. The decoder 308 of the TTS model (e.g., TTS 182) is conditioned via the hierarchical VAE described above.

As depicted in FIG. 3A, the prior of the CSVAE (e.g., conditioning secondary VAE 140) is defined as a standard Gaussian distribution $\mathcal{N}(z_c; 0, \mathbb{I})$. This distribution is sampled from following the reparametrization trick of Eq. 2. Concerning the CPVAE (e.g., conditional primary VAE 150 of FIG. 1 including CPVAE encoder 350), its posterior is not directly normally distributed but instead is conditioned on the posterior of the CSVAE ($z_c$). To this end, the extended reparameterization trick is used as follows to sample from the CPVAE space:

$$z = \mu + \sigma \odot z_c \quad (5)$$
$$= \mu + \sigma \odot (\mu_c + \sigma_c \odot \epsilon)$$
$$= (\mu + \sigma \odot \mu_c) + (\sigma \odot \sigma_c) \odot \epsilon,$$

where $\mu_c$ and $\sigma_c$ are generated from the CSVAE encoder 340 and $z_c$ is a sample from the CSVAE latent space. $\mu$ and $\sigma$ are generated from the CPVAE encoder 350 and z (latent variable 316) is a sample from the CPVAE latent space. While $z_c$ follows the reparametrization trick of Eq. 2 where $\mathcal{N}(z_c; 0, \mathbb{I})$ acts as the prior, the extended reparametrization trick samples z using the posterior of CSVAE $\mathcal{N}(z; \mu_c, \sigma_c^2)$ as prior.

During inference, in the CSVAE (e.g., CSVAE encoder 340 and CSVAE decoder 342) the samples are drawn from the posterior since the conditioning is still provided as one-hot speaker vectors (e.g., speaker vector 344). Then, the CPVAE samples a latent variable from the posterior of CSVAE given the type of prosodic expressivity (rather than a general prior distribution) and generates a sample (latent variable 316). This results in samples from a very similar region if conditioned on the same signal.

The complete loss of the system is:

$$\mathcal{L} = \lambda(\mathcal{L}_{KL}^{CSVAE} + \mathcal{L}_{KL}^{CPVAE}) + \mathcal{L}_{rec}^{CSVAE} + \mathcal{L}_{rec}^{CPVAE}, \quad (6)$$

where $$\mathcal{L}_{KL}^{CSVAE} = \text{KL}(\mathcal{N}(\mu_c, \sigma_c^2) \| \mathcal{N}(0, \mathbb{I})) \quad (7)$$

and $$\mathcal{L}_{KL}^{CPVAE} = \text{KL}(\mathcal{N}(\mu + \sigma \odot \mu_c, (\sigma \odot \sigma_c)^2) \| \mathcal{N}(\mu_c, \sigma_c^2)) \quad (8)$$

As shown above, the complete loss of the architecture of the learned condition TTS component 180 depicted in FIG. 3A includes two KL terms, one for CSVAE and one for CPVAE. The CSVAE KL term is the standard KL term for a VAE encoder defined as the KL divergence between its posterior and the standard Gaussian prior (Eq. 7). In the case of CPVAE, its posterior is now a Gaussian distribution $\mathcal{N}(\mu + \sigma \odot \mu_c, (\sigma \odot \sigma_c)^2)$. This modifies the CPVAE KL loss to the KL divergence between the posterior of CPVAE and the posterior of CSVAE (Eq. 8). The weights of CSVAE are frozen prior to computing the CPVAE KL divergence to keep the posterior of the CSVAE stable and move the posterior of the CPVAE. The same KL annealing scheme as in baseline model is used both for CSVAE and CPVAE KL losses. On top of the reconstruction loss of the Primary VAE ($\mathcal{L}_{rec}^{CPVAE}$ in Eq. 6), an L1 loss is included as the reconstruction loss of the Secondary VAE ($\mathcal{L}_{rec}^{CSVAE}$ in Eq. 6).

As depicted in FIG. 3A, the baseline network is a sequence-to-sequence (seq2seq) TTS model that converts an input phoneme sequence (phoneme input 302) into audio sequence 310 (e.g., a generated mel-spectrogram). A phoneme may be a data representation of text that represents sounds of the text when spoken. The seq2seq TTS model (e.g., TTS 182 of FIG. 1) comprises phoneme encoder 304 and decoder 308. The input to the decoder 308 is the concatenation (concatenation 306) of the states of two encoders: a phoneme encoder 304 that encodes an input phoneme sequence, and a CPVAE encoder 350 that encodes a reference audio sequence 312 (e.g., a mel-spectrogram) into a fixed-length low-dimensional latent representation from which a latent variable z (latent variable 316) is sampled. A vocoder may be used to reconstruct waveforms.

As depicted in FIG. 3B, the baseline network is a sequence-to-sequence (seq2seq) TTS model that converts an input phoneme sequence (phoneme input 302) into audio sequence 310 (e.g., a generated mel-spectrogram). A phoneme may be a data representation of text that represents sounds of the text when spoken. The seq2seq TTS model (e.g., TTS 182 of FIG. 1) comprises phoneme encoder 304 and decoder 308. The input to the decoder 308 is the concatenation (concatenation 306) of the states of two encoders: a phoneme encoder 304 that encodes an input phoneme sequence, and a CPVAE encoder 350 that encodes a reference audio sequence 312 (e.g., a mel-spectrogram) into a fixed-length low-dimensional latent representation from which a latent variable z (latent variable 316) is sampled. In FIG. 3B, there is an extra input source, speaker embedding 314, whose mean $\mu_{spk}$ and standard deviation $\sigma_{spk}$ are provided. These represent a pre-trained distribution on the type of prosody expressivity, in place of the distribution learned by a Conditioning Secondary VAE. Speaker embeddings 314 is first concatenated to the input of the CPVAE encoder 350. Then it is combined with the output of the CSVAE sampler S following the same extended reparametrization trick used in FIG. 3A and presented in Equation (5). In FIG. 3B, the latent variables of the CPVAE space are still shifted and the sampling is still done from the posterior given a condition. However, the shift follows directions that have been pre-trained to minimize loss of a different task, instead of directions that have been learned jointly with the rest of the system's parameters as when CSVAE is used.

The loss of the architecture depicted in FIG. 3B is:

$$\mathcal{L} = \lambda(\mathcal{L}_{KL}^{CPVAE}) + \mathcal{L}_{rec}^{CPVAE},$$

where $\mathcal{L}_{KL}^{CPVAE} = KL(\mathcal{N}(\mu + \sigma \odot \mu_c, (\sigma \odot \sigma_c)^2) \| \mathcal{N}(\mu_c, \sigma_c^2))$.

Here $(\mu_c = \mu_{spk}, \sigma_c^2 = \sigma_{spk}^2)$ and instead of learning $(\mu_c, \sigma_c^2)$ from a conditioning Secondary VAE, a pre-trained distribution is used (e.g., from a speaker verification system that outputs a speaker embedding for each speaker). Similar to the system depicted in FIG. 3A, z (latent variable 316) may be concatenated (concatenation 306) with the output of the text encoder 304. The concatenated output may be provided to decoder 308 which may output the audio sequence 310.

Figure 4:
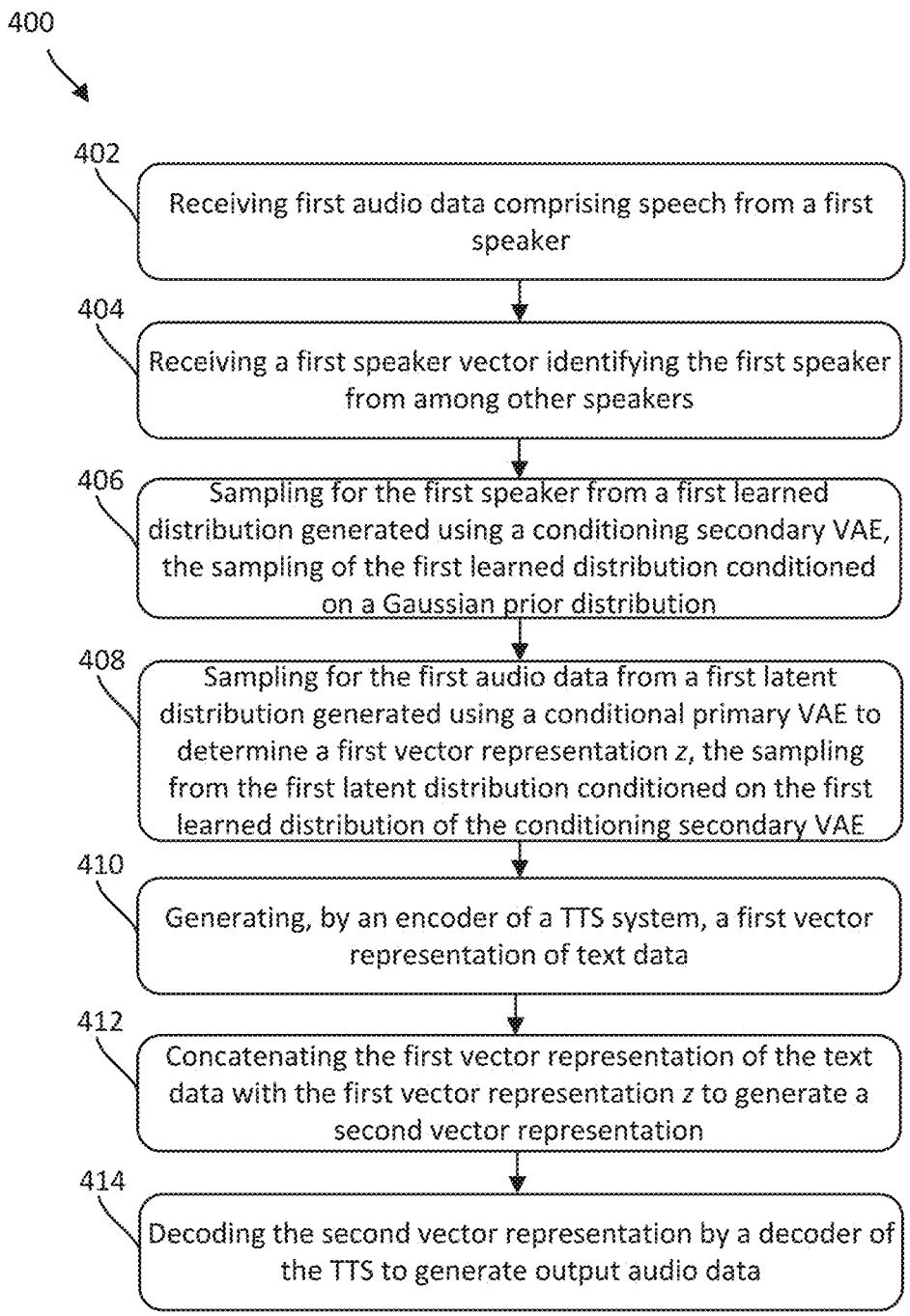
FIG. 4 is a flow chart illustrating an example process during inference for generation of audio for text data that includes audio characteristics associated with a first speaker, according to various embodiments of the present disclosure.

FIG. 4 is a flow chart illustrating an example inference process 400 for generating audio for text data that includes audio characteristics associated with a first speaker, according to various embodiments of the present disclosure. Those actions in FIG. 4 that have been previously described in reference to FIGS. 1-3 may not be described again herein for purposes of clarity and brevity. The actions of the process depicted in the flow diagram of FIG. 4 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure. Further, some steps may be performed in parallel depending on the particular implementation.

Process 400 may begin at action 402, at which first audio data may be received that includes speech from a first speaker. In various examples, during training, audio samples from the first speaker (e.g., a voice actor) may be received along with the text (or a phoneme representation of the text) that corresponds to the audio samples (e.g., text being read by the first speaker to generate the first audio data).

Processing may continue at action 404, at which a first speaker vector may be received that identifies the first speaker from among other speakers. In various examples, the first speaker vector may be an one hot encoding that identifies the speaker. The speaker may be selected by the user. For example, the user may want a particular text read in the voice of a particular actor. Selection of the speaker may be effective to condition the synthetic speech generated using the TTS system on the audio characteristics of the speaker, as described herein.

Processing may continue at action 406, at which sampling for the first speaker from a first learned distribution may be performed. The first learned distribution may be generated using a conditioning secondary VAE. The sampling of the first learned distribution may be conditioned on a Gaussian prior distribution. For example, as described above in reference to FIG. 3A, a latent distribution conditioned on a Gaussian prior distribution may be learned by the CSVAE based on the input speaker vector.

Processing may continue at action 408, at which a first vector representation z may be determined by sampling for the first audio data from a first latent distribution. The first latent distribution may be generated using a conditional primary VAE to determine the first vector representation z. The sampling from the first latent distribution may be conditioned on the first learned distribution of the conditioning secondary VAE. For example, a conditional primary VAE may be used to generate a first latent distribution for the first audio data. The sampling of the first latent distribution may be conditioned on the first learned distribution. At action 408, the conditional primary VAE (e.g., the CPVAE) may generate a first latent distribution conditioned on the learned latent distribution from action 406.

Processing may continue at action 410, at which an encoder of a TTS system (e.g., phoneme encoder 304 of TTS 182) may generate a first vector representation of text data. In various examples, the text data may be text data selected by a user for output in the form of synthesized speech. For example, the text data may be a book selected by a user for output as an audio book.

Processing may continue at action 412, at which the first vector representation of the text data may be concatenated or otherwise combined with the first vector representation z to generate a second vector representation. At action 412, the output of the seq2seq encoder of the TTS system may be concatenated with the latent variable z sampled from the hierarchical VAE (as described herein) to generate a representation of the text that is conditioned on the variability of the selected type of prosodic expressivity (e.g., the prosody and/or variability of the acoustic characteristics associated with prosody of the selected speaker).

Processing may continue at action 414, at which the second vector representation may be decoded by a decoder of the TTS (e.g., decoder 308), to generate output audio data. The output audio data may thereafter be output by a loudspeaker of a device (e.g., of the requesting-user's device).

Although in many of the examples described herein, a single type of prosodic expressivity c is selected and used to condition the synthetic speech, in various embodiments, multiple types of prosodic expressivity may be used. For example, a separate conditioning VAE may be used to learn distributions for each different type of prosodic expressivity.

Accordingly, a hierarchical VAE implementation, as discussed herein, may be used to incorporate multiple types of prosodic expressivity into TTS systems. In various examples where multiple types of prosodic expressivity are used, the conditioning VAE associated with one type of prosodic expressivity may be frozen while parameters of the conditioning VAE associated with the other types of prosodic expressivity are updated (and vice versa) during training.

Figure 5:
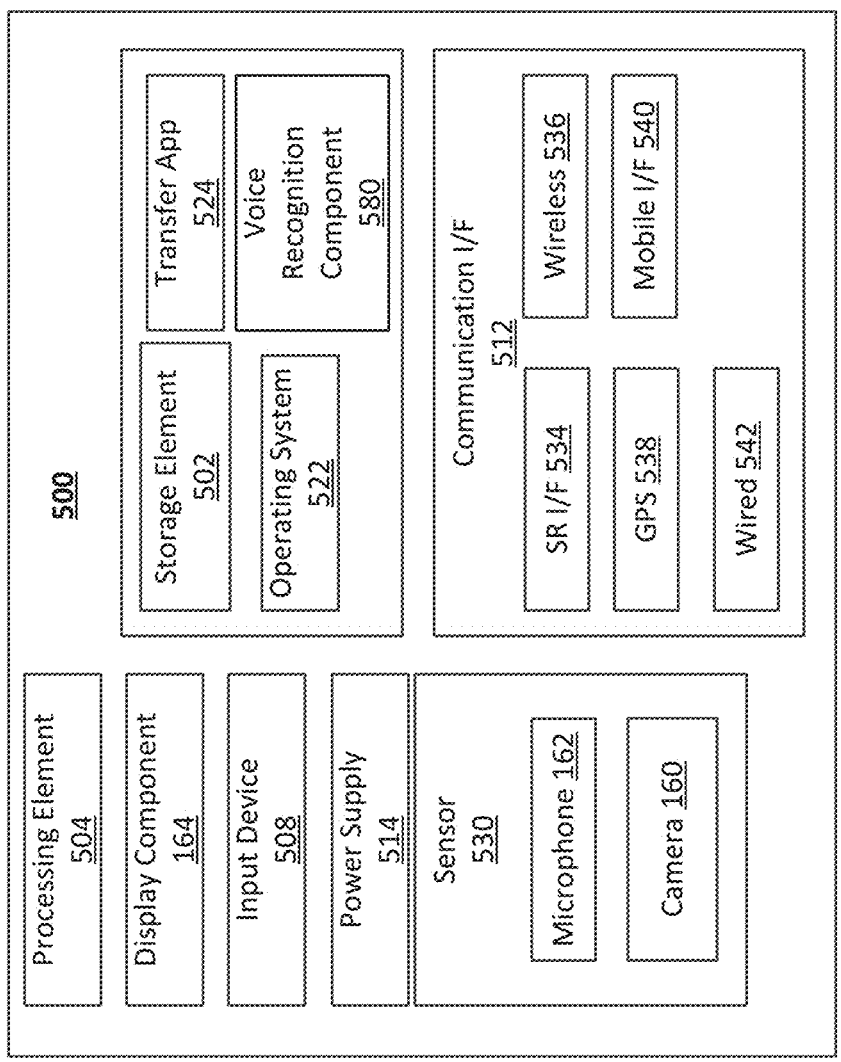
FIG. 5 is a block diagram showing an example system of a computing device that may be used in accordance with various embodiments described herein.

FIG. 5 is a block diagram showing an example system 500 of a computing device that may be used to implement, at least in part, one or more of the components described herein for learned condition text-to-speech synthesis, in accordance with various aspects of the present disclosure. It will be appreciated that not all devices will include all of the components of the system 500 and some user devices may include additional components not shown in the system 500. The system 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs), tensor processing units, graphical processing units, etc. In some examples, the processing element 504 may be effective to determine a wakeword and/or to stream audio data to natural language processing system 120. The storage element 502 can include one or more different types of memory, data storage, or computer-readable storage media devoted to different purposes within the system 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc.

The storage element 502 may also store software for execution by the processing element 504. An operating system 522 may provide the user with an interface for operating the computing device and may facilitate communications and commands between applications executing on the system 500 and various hardware thereof. A transfer application 524 may be configured to receive images, audio, and/or video from another device (e.g., a mobile device, image capture device, and/or display device) or from an image sensor and/or microphone included in the system 500. In some examples, the transfer application 524 may also be configured to send the received voice requests to one or more voice recognition servers (e.g., natural language processing system 120).

When implemented in some user devices, the system 500 may also comprise a display component 164. The display component 164 may comprise one or more light-emitting diodes (LEDs) or other suitable display lamps. Also, in some examples, the display component 164 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 164 may be effective to display content determined provided by a skill executed by the processing element 504 and/or by another computing device.

The system 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the system 500. These input devices 508 may be incorporated into the system 500 or operably coupled to the system 500 via wired or wireless interface. In some examples, system 500 may include a microphone or an array of microphones for capturing sounds, such as voice requests. A voice recognition component 580 may interpret audio signals of sound captured by microphone. In some examples, voice recognition component 580 may listen for a "wakeword" to be received by one or more microphones of the system 500. Upon receipt of the wakeword, voice recognition component 580 may stream audio to a voice recognition server for analysis, such as natural language processing system 120. In various examples, voice recognition component 580 may stream audio to external computing devices via communication interface 512.

When the display component 164 includes a touch-sensitive display, the input devices 508 can include a touch sensor that operates in conjunction with the display component 164 to permit users to interact with the image displayed by the display component 164 using touch inputs (e.g., with a finger or stylus). The system 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as a computer communication network, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the system 500. A wired communication module 542 may be configured to communicate according to the USB protocol or any other suitable protocol. The system 500 may also include one or more sensors 530 such as, for example, one or more position sensors, camera(s) 160, and/or motion sensors.

Figure 6:
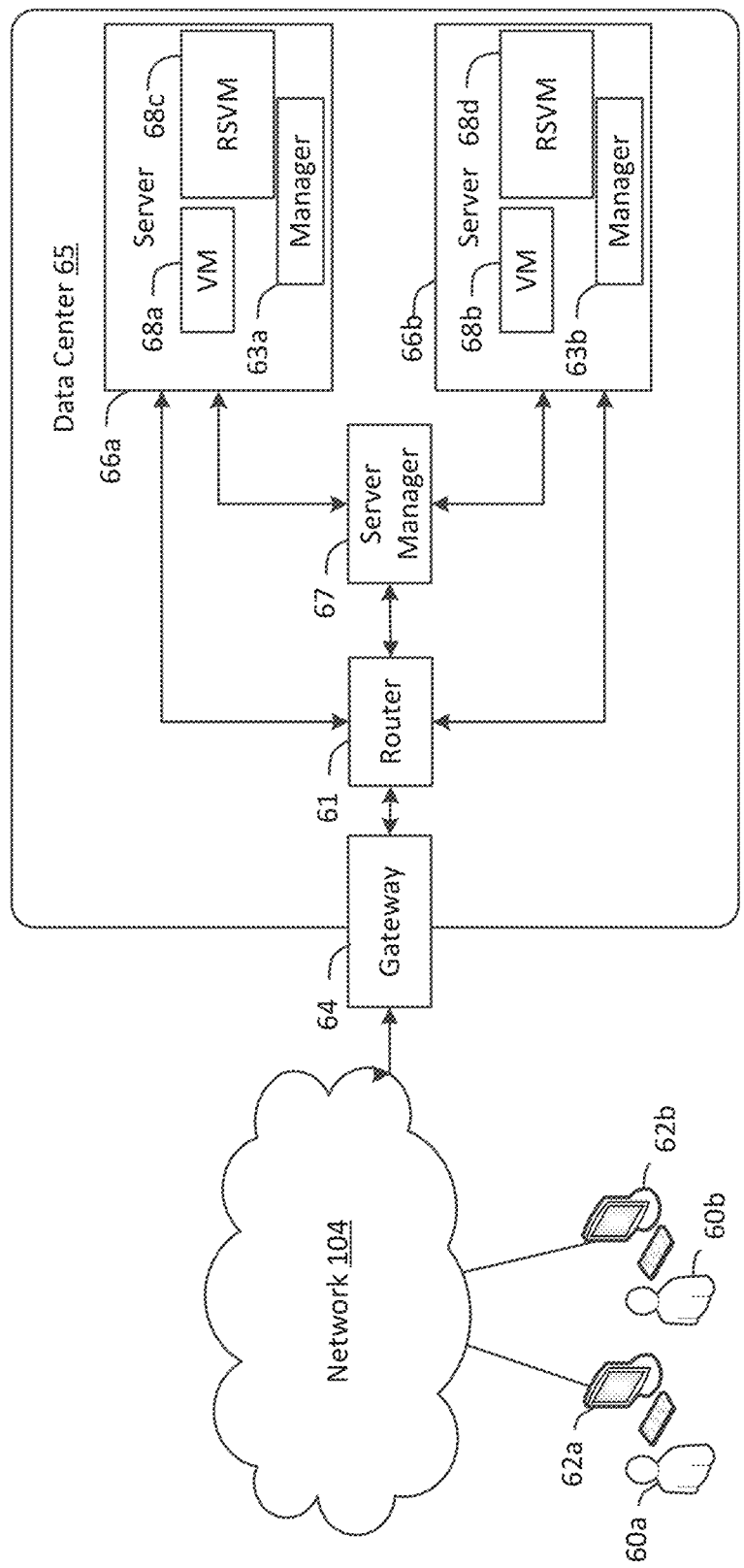
FIG. 6 is a diagram illustrating an example system for sending and providing data that may be used in accordance with the present disclosure.

FIG. 6 is a diagram illustrating an example system for sending and providing data that may be used in accordance with the present disclosure. In particular, FIG. 6 illustrates an example computing environment in which the embodiments described herein may be implemented. For example, the computing environment of FIG. 6 may be used to provide the various machine learning models described herein as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60a and 60b (which may be referred herein singularly as user 60 or in the plural as users 60) via user computers 62a and 62b (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. In various examples, the instances may be configured to execute one or more of the various machine learning techniques described herein.

These services may be configurable with set or custom applications and may be configurable in size, execution, cost, latency, type, duration, accessibility and in any other dimension. These web services may be configured as available infrastructure for one or more clients and can include one or more applications configured as a system or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large-scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66a and 66b. Router 61 may also be connected to gateway 64, which is connected to network 104. Router 61 may be connected to one or more load balancers, and alone or in combination may manage communications within networks in data center 65, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66a and 66b. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location or other attributes associated with user computers 62, a nature of a task with which the communications are associated, a priority of a task with which the communications are associated, a duration of a task with which the communications are associated, a size and/or estimated resource usage of a task with which the communications are associated and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, used to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example, computer servers, storage devices, network devices, and the like. In some embodiments, a client or user may be provided direct access to a resource instance, e.g., by giving a user an administrator login and password. In other embodiments, the provider network operator may allow clients to specify execution requirements for specified client applications and schedule execution of the applications on behalf of the client on execution systems (such as application server instances, Java™ virtual machines (JVMs), general-purpose or special-purpose operating systems that support various interpreted or compiled programming languages such as Ruby, Perl, Python, C, C++, and the like, or high-performance computing systems) suitable for the applications, without, for example, requiring the client to access an instance or an execution system directly. A given execution system may utilize one or more resource instances in some implementations; in other implementations, multiple execution systems may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware system, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments, the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method of generating learned condition audio data from input text data, comprising:
   receiving a first speaker vector identifying a first speaker from among other speakers;
   receiving first audio data comprising speech from the first speaker;
   sampling from a first learned distribution for the first speaker, the first learned distribution being generated using a first conditioning secondary variational auto-encoder (VAE), wherein the sampling from the first learned distribution is conditioned on a Gaussian prior distribution;
   sampling from a first latent distribution for the first audio data to determine a first vector representation z, the first latent distribution generated using a conditional primary VAE, wherein the sampling from the first latent distribution is conditioned on the first learned distribution for the first speaker;
   receiving, by an encoder of a text-to-speech (TTS) system, first text data;
   generating, by the encoder of the TTS system, a first vector representation of the first text data;
   concatenating the first vector representation of the first text data with the first vector representation z to generate a second vector representation;
   decoding the second vector representation by a decoder of the TTS system to generate second audio data, wherein the second audio data corresponds to the first text data, wherein the second audio data comprises prosody associated with the first speaker; and
   outputting the second audio data.

2. The method of claim 1, further comprising:
   receiving a second speaker vector identifying a second speaker from among the other speakers;
   receiving third audio data comprising speech from the second speaker;
   sampling from the first learned distribution for the second speaker, the first learned distribution being generated using the first conditioning secondary VAE, wherein the sampling from the first learned distribution is conditioned on the Gaussian prior distribution;
   sampling from the first latent distribution for the third audio data to determine a third vector representation z, the first latent distribution generated using the conditional primary VAE, wherein the sampling from the first latent distribution is conditioned on the first learned distribution;

concatenating the first vector representation of the first text data with the third vector representation z to generate a fourth vector representation;
decoding the fourth vector representation by the decoder of the TTS system to generate fourth audio data, wherein the fourth audio data comprises prosody associated with the second speaker; and
outputting the fourth audio data.

3. The method of claim 1, further comprising:
receiving a first language vector comprising language identifier data indicating a language of the first audio data;
receiving the first audio data comprising information related to the language;
sampling from a second learned distribution for the first language vector, the second learned distribution being generated using a second conditioning secondary VAE;
sampling from a second latent distribution generated by the conditional primary VAE to determine a third vector representation z', wherein the sampling from the second latent distribution is conditioned on the second learned distribution;
receiving, by the encoder of the TTS system, second text data;
generating, by the encoder of the TTS system, a fourth vector representation of the second text data;
concatenating the third vector representation of the second text data with the third vector representation z' to generate a fifth vector representation;
decoding the fifth vector representation by the decoder of the TTS system to generate third audio data, wherein the third audio data corresponds to the first text data, wherein the third audio data comprises prosody associated with the language; and
outputting the third audio data.

4. A method comprising:
receiving, from a first computing device, first data representing a type of prosodic expressivity;
receiving a selection of content comprising text data;
determining first audio data comprising an audio representation of the text data, wherein the first audio data is generated based at least in part on sampling from a first latent distribution generated using a conditional primary variational autoencoder (CPVAE), the sampling from the first latent distribution being conditioned on a first learned distribution associated with the type of prosodic expressivity; and
sending the first audio data to the first computing device.

5. The method of claim 4, further comprising:
receiving, by a conditioning secondary VAE, the first data representing the type of prosodic expressivity; and
generating, by the conditioning secondary VAE, the first learned distribution.

6. The method of claim 5, further comprising:
receiving, by the CPVAE, second audio data associated with the type of prosodic expressivity; and
determining, by the CPVAE, the first latent distribution.

7. The method of claim 6, further comprising:
determining a first vector representation of the type of prosodic expressivity by the sampling from the first latent distribution;
determining, by a text-to-speech encoder, a second vector representation of the text data; and
combining the first vector representation and the second vector representation to generate a third vector representation.

8. The method of claim 7, further comprising:
decoding, by a text-to-speech decoder, the third vector representation to generate the first audio data; and
storing the first audio data in a data store in association with data identifying the text data and data identifying the type of prosodic expressivity.

9. The method of claim 4, wherein the first learned distribution is a pre-trained embedding representing the type of prosodic expressivity.

10. The method of claim 4, wherein the type of prosodic expressivity is a first type of prosodic expressivity, the method further comprising:
receiving, from the first computing device, second data representing a selection of a second type of prosodic expressivity; and
determining the first audio data using the CPVAE conditioned on the first learned distribution and a second learned distribution associated with the second type of prosodic expressivity.

11. The method of claim 4, wherein the type of prosodic expressivity comprises acoustic characteristics associated with prosody of a specified person.

12. The method of claim 4, wherein the type of prosodic expressivity comprises acoustic characteristics associated with a native speaker of a first language.

13. The method of claim 4, wherein the type of prosodic expressivity comprises acoustic characteristics associated with a first emotion.

14. A system comprising:
at least one processor; and
non-transitory computer-readable memory storing instructions that, when executed by the at least one processor, are effective to:
receive, from a first computing device, first data representing a selection of a type of prosodic expressivity;
receive a selection of content comprising text data;
determine first audio data comprising an audio representation of the text data, wherein the first audio data is generated based at least in part on sampling from a first latent distribution generated using a conditional primary variational autoencoder (CPVAE), the sampling from the first latent distribution being conditioned on a first distribution associated with the type of prosodic expressivity; and
send the first audio data to the first computing device.

15. The system of claim 14, the non-transitory computer-readable memory storing further instructions that, when executed by the at least one processor, are further effective to:
receive, by a conditioning secondary VAE, the first data; and
generate, by the conditioning secondary VAE, the first distribution.

16. The system of claim 15, the non-transitory computer-readable memory storing further instructions that, when executed by the at least one processor, are further effective to:
receive, by the CPVAE, second audio data associated with the type of prosodic expressivity; and
determine, by the CPVAE, the first latent distribution.

17. The system of claim 16, the non-transitory computer-readable memory storing further instructions that, when executed by the at least one processor, are further effective to:
determine a first vector representation of the type of prosodic expressivity by the sampling from the first latent distribution;

determine, by a text-to-speech encoder, a second vector representation of the text data; and combine the first vector representation and the second vector representation to generate a third vector representation.

18. The system of claim 17, the non-transitory computer-readable memory storing further instructions that, when executed by the at least one processor, are further effective to:

decode, by a text-to-speech decoder, the third vector representation to generate the first audio data; and store the first audio data in a data store in association with data identifying the text data and data identifying the type of prosodic expressivity.

19. The system of claim 14, wherein the first distribution is a pre-trained embedding representing the type of prosodic expressivity.

20. The system of claim 14, wherein the type of prosodic expressivity is a first type of prosodic expressivity and wherein the non-transitory computer-readable memory stores further instructions that, when executed by the at least one processor, are further effective to:

receive, from the first computing device, second data representing a selection of a second type of prosodic expressivity; and determine the first audio data using the CPVAE conditioned on the first distribution and a second distribution associated with the second type of prosodic expressivity.

* * * * *